United States Patent
Yoshida et al.

(10) Patent No.: US 7,442,329 B2
(45) Date of Patent: Oct. 28, 2008

(54) METHOD OF MANUFACTURING SEPARATOR FOR FUEL CELLS

(75) Inventors: Tsunemori Yoshida, Kobe (JP); Katsunori Sugita, Sanda (JP)

(73) Assignees: Nippon Pillar Packing Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 264 days.

(21) Appl. No.: 11/411,819

(22) Filed: Apr. 27, 2006

(65) Prior Publication Data

US 2006/0263669 A1    Nov. 23, 2006

Related U.S. Application Data

(62) Division of application No. 10/211,345, filed on Aug. 5, 2002, now abandoned.

(30) Foreign Application Priority Data

Aug. 8, 2001   (JP) ............... 2001-240254

(51) Int. Cl.
    *H01B 1/24*   (2006.01)
(52) U.S. Cl. ..................... 252/511; 264/105
(58) Field of Classification Search ............... 252/511; 429/34–39; 264/105
    See application file for complete search history.

(56) References Cited

U.S. PATENT DOCUMENTS 4,359,438 A * 11/1982 Hoggins et al. ............. 264/105
6,171,720 B1   1/2001 Besmann et al.
6,468,685 B1  10/2002 Yoshida
6,500,893 B2  12/2002 Yamada et al.
6,864,008 B2 *  3/2005 Otawa et al. ................. 429/34
7,199,186 B2 *  4/2007 Ide et al. ..................... 524/876
2002/0146613 A1  10/2002 Otawa et al.
2006/0172175 A1 *  8/2006 Otawa et al. ................. 429/34

FOREIGN PATENT DOCUMENTS

| EP | 0469166 | * | 2/1992 |
| EP | 1 094 045 A2 | | 4/2001 |
| JP | 56-116277 | | 9/1981 |
| JP | 62-160661 A1 | | 7/1987 |
| JP | H11-195422 | | 7/1999 |
| JP | 2000-021421 | | 1/2000 |
| JP | 2000-077079 | | 3/2000 |

OTHER PUBLICATIONS

European Search Report dated Jan. 15, 2003.
Korean Patent Office Examination Report dated Apr. 19, 2004.

* cited by examiner

*Primary Examiner*—Mark Kopec
(74) *Attorney, Agent, or Firm*—Cheng Law Group PLLC

(57) ABSTRACT

A separator for fuel cells is provided, which has excellent electrical conductivity, mechanical strength and gas impermeability. The separator is a molded article of a carbon-phenol resin molding compound obtained by reacting a phenol with an aldehyde in the presence of a catalyst, while mixing them with a carbon powder. As the catalyst, it is possible to use at least one selected from tertiary amines, carbonates, hydroxides and oxides of alkali metals or alkali earth metals. It is preferred that a content of nitrogen constituent in the molding compound is 0.3 wt % or less, and a carbon content in the molding compound is within a range of 75 wt % to 97 wt %.

5 Claims, 1 Drawing Sheet

METHOD OF MANUFACTURING SEPARATOR FOR FUEL CELLS

RELATED APPLICATION

This application is a divisional application of application Ser. No. 10/211,345 filed on Aug. 5, 2002, now abandoned the contents of which are hereby incorporated in its entirety by reference.

BACKGROUND OF THE INVENTION

1. Field of the Invention

The present invention relates to a separator for fuel cells, and particularly a separator for solid-polymer electrolyte type fuel cells, which is a molded article of a carbon-phenol resin molding compound.

2. Disclosure of the Prior Art

In conventional fuel cells, a fuel gas containing hydrogen is supplied to an anode, and air containing oxygen is supplied to a cathode that is spaced away from the anode by an electrolyte film. The following electrochemical reactions happen at the anode and cathode sides, respectively.

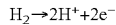

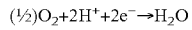

Therefore, this fuel cell provides electric energy according to the electrochemical reaction of $H_2+(\frac{1}{2})O_2 \rightarrow H_2O$.

FIG. 1 is an enlarged cross-sectional view of a solid-polymer electrolyte type fuel cell. This fuel cell comprises an electrolyte film 1 formed by an ion exchange membrane of a fluorinated resin, anode 2 and cathode 3 that are formed by a carbon cloth or a carbon paper, and a pair of separators 4 having flow channels (5, 6). The anode and cathode (2, 3) are placed at both sides of the electrolyte film 1. The separators 4 are placed on the anode and cathode (2, 3) such that the fuel gas containing hydrogen is supplied to the anode 2 through the flow channels 5 of one of the separators and the air containing oxygen is supplied to the cathode 3 through the flow channels 6 of the other separator. For the separators used in the conventional fuel cells, electrical conductivity and gas impermeability are important characteristics. For example, as described in Japanese Patent Early Publications No. 11-195422, No. 2000-21421, and No. 2000-77079, it has been proposed to use a molded article of a molding compound containing a carbon powder and a phenol resin as the separator.

However, in the conventional separators, there is a problem that electrical properties such as volume resistivity are not sufficiently satisfied. That is, as a content of the carbon powder in the molding compound is increased to improve the electrical properties, a content of the phenol resin in the molding compound relatively decreases. In such a case, since a flowability of the molding compound in the molding stage lowers, there is a fear that clearances among carbon particles can not be uniformly filled with the phenol resin, so that molded articles having residual pores are obtained. As a result, this leads to a decrease in mechanical strength and deterioration in gas impermeability of the separator.

SUMMARY OF THE INVENTION

Therefore, a primary concern of the present invention is to provide a separator for fuel cells, which has excellent electrical conductivity, mechanical strength and gas impermeability.

That is, the separator of the present invention is a molded article of a carbon-phenol resin molding compound obtained by reacting a phenol with an aldehyde in the presence of a catalyst, while mixing them with a carbon powder.

It is preferred that the separator is of a thin-plate shape having a flow channel.

In addition, it is preferred that a carbon content in the molding compound is within a range of 75 wt % to 97 wt %.

As the catalyst used in the present invention, it is preferred to use at least one selected from tertiary amines, carbonates, hydroxides and oxides of alkali metals or alkali earth metals.

Moreover, it is preferred that a content of nitrogen constituent in the molding compound is 0.3 wt % or less.

It is also preferred that the carbon powder contains 90 wt % or more of fixed carbon.

These and still other objects and advantages of the present invention will become more apparent from the detail description and Examples of the present invention explained below.

The present disclosure relates to subject matter contained in Japanese Patent Application No. 2001-240254, filed on Aug. 8, 2001, the disclosure of which is expressly incorporated herein by reference in its entirety.

DETAIL DESCRIPTION OF THE INVENTION

Figure 1:
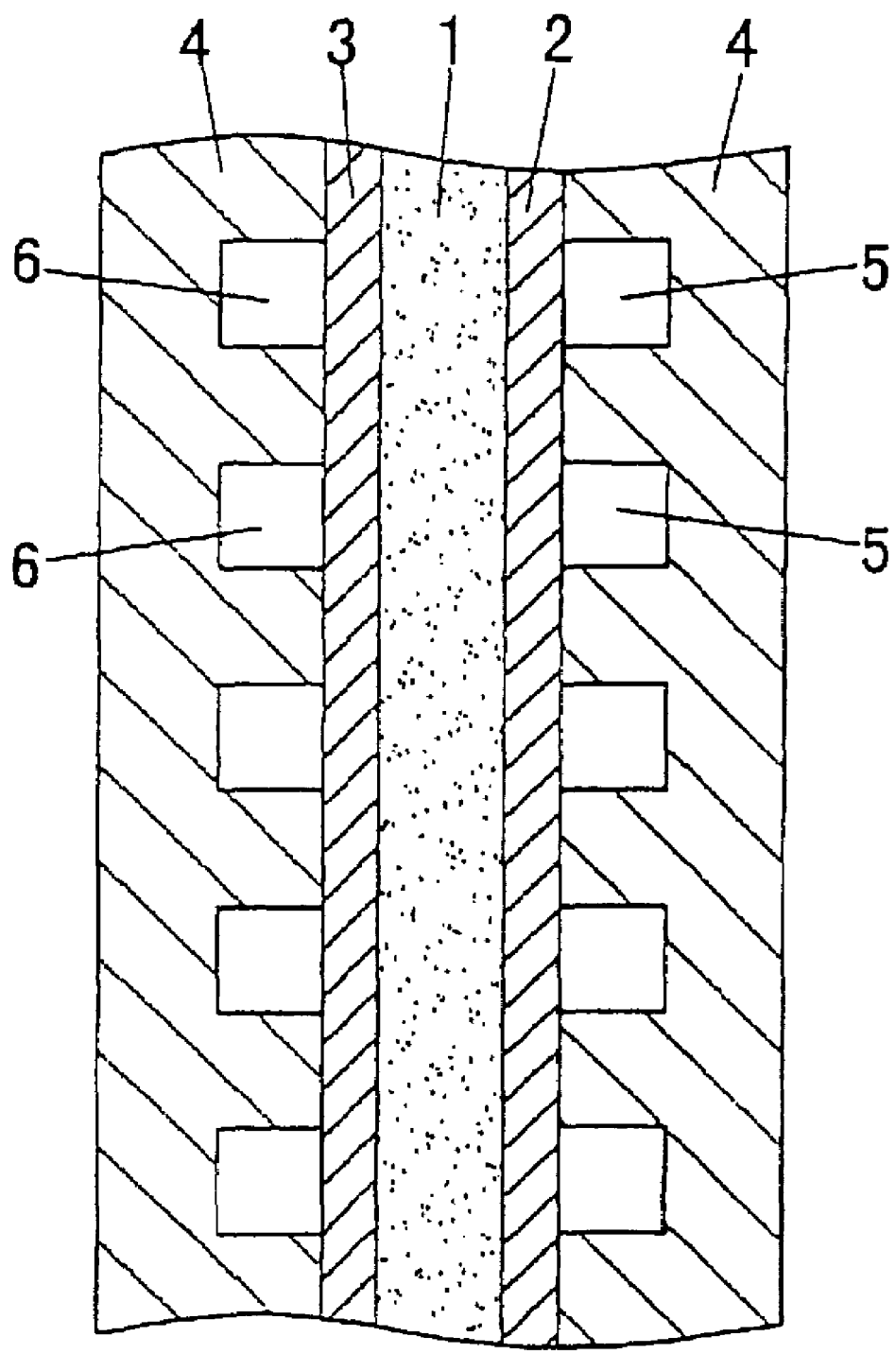
FIG. 1 is an enlarged cross-sectional view of a solid-polymer electrolyte type fuel cell.

A separator for fuel cells of the present invention is a molded article of a carbon-phenol resin molding compound obtained by reacting a phenol with an aldehyde in the presence of a catalyst, while mixing them with a carbon powder. Since carbon particles work as nuclei during the reaction, a wet granular material of the carbon powder and the generated phenol resin is obtained. By filtrating and drying the wet granular material, it is possible to obtain a dry granular powder of the carbon-phenol resin molding compound.

As the carbon powder used in the present invention, for example, it is possible to use natural graphite, artificial graphite, Kish graphite, exfoliated graphite, carbon black, mesophase graphite, coke, charcoal, husk carbon, powder of carbon fiber or the like. In addition, it is preferred to use the carbon powder containing 90 wt % or more of fixed carbon. As the content of fixed carbon increases, the carbon powder contains a higher amount of carbon, and impurities in the carbon powder decrease. Therefore, the characteristics of the separator for fuel cells can be remarkably improved. An upper limit of the content of fixed carbon is 100 wt %. A particle size of the carbon powder is not limited. However, the carbon powder having a particle size of 1 to 200 µm is preferably used.

In the present invention, as the phenol that is one of the basic ingredients of the phenol resin, it is preferred to use a phenol having hydrophobicity, which is hardly soluble in water. In addition, it is preferred that a solubility in water of the hydrophobic phenol is 5 or less at normal temperature (30° C.). The term of "solubility in water" is defined as the maximum amount (g) of a solute that can be dissolved in 100 g of water. Therefore, 5 or less of the solubility in water of the hydrophobic phenol means that a saturated state is achieved when 5 g of the hydrophobic phenol is dissolved in 100 g of water. When using the hydrophobic phenol, a lower limit of the solubility is zero.

Specifically, as the hydrophobic phenol, for example, it is possible to use o-cresol, m-cresol, p-cresol, p-t-butyl phenol, 4-t-butyl catechol, m-phenyl phenol, p-phenyl phenol, p-(α-cumyl) phenol, p-nonyl phenol, guaiacol, bisphenol-A, bisphenol-S, bisphenol-F, o-chloro phenol, p-chloro phenol, 2,4-dichloro phenol, o-phenyl phenol, 3,5-xylenol, 2,3-xylenol, 2,5-xylenol, 2,6-xylenol, 3,4-xylenol, p-octylphenol, or the like. One of these compounds, or a combination of two or more of these compounds can be used as the hydrophobic phenol.

In addition, a phenol having hydrophilicity that a solubility in water of the phenol is more than 5 at normal temperature (30° C.) may used together with the hydrophobic phenol described above. As such a water-soluble phenol, for example, it is possible to use phenol, catechol, tannin, resorcin, hydroquinone, pyrogallol, or the like. One of these compounds, or a combination of two or more of these compounds can be used as the hydrophilic phenol.

As the amount used of the hydrophobic phenol increases, an effect of preventing aggregation of the wet granular material of the carbon powder and the phenol resin becomes higher. For example, it is preferred that 5 wt % or more of the phenol used in the present invention is the hydrophobic phenol. When the amount used of the hydrophobic phenol is less than 5 wt %, the aggregation of the wet granular material may occurs. An upper limit of the amount used of the hydrophobic phenol is 100 wt %.

As the aldehyde that is the other one of the basic ingredients of the phenol resin, it is particularly preferred to use formalin that is an aqueous solution state of formaldehyde. Alternatively, for example, it is possible to use trioxane, tetraoxane, paraformaldehyde, or the like. In addition, at least a part of formaldehyde may be replaced with furfural or furfuryl alcohol.

In the present invention, as the catalyst used for the additional condensation reaction between the phenol and the aldehyde, it is possible to use a basic catalyst for synthesizing a resol-type phenol resin. However, it is needed to select the basic catalyst so as not to increase a nitrogen content in the molding compound. That is, when a catalyst for synthesizing an ammonia resol-type phenol resin, i.e., a nitrogen containing compound such as ammonia, primary amines or secondary amines is used to synthesize the phenol resin, there is a fear that a large amount of nitrogen impurities remains in the phenol resin.

As a content of the nitrogen impurities in the molding compound increases, the following disadvantage may occur. In general, it is needed to run a cooling water having antifreeze property and low electrical conductivity in the fuel cell stack during the operation of fuel cell. It is preferred that the electrical conductivity of the cooling water is maintained within the range of 200 µS/cm or less. At this time, the nitrogen impurities included in the separator are ionized, so that the ionized nitrogen impurities elute into the cooling water. This leads to an increase in electrical conductivity of the cooling water. As a result, the occurrence of electric leakage in the fuel cell and a reduction in EMF (electromotive force) of the fuel cell come into problems. Thus, the reliability of the fuel cells may decrease because of the elution of nitrogen impurities from the separator.

From the above viewpoint, in the present invention, it is preferred that a content of nitrogen constituent in the molding compound is 0.3 wt % or less. Specifically, to reduce the content of nitrogen constituent, it is preferred to use at least one selected from carbonates, hydroxides and oxides of alkali metal such as sodium, potassium, lithium and so on, carbonates, hydroxides and oxides of alkali earth metal such as calcium, magnesium, barium and so on, and tertiary amines. For example, it is possible to use sodium hydroxide, potassium hydroxide, lithium hydroxide, sodium carbonate, calcium hydroxide, magnesium hydroxide, barium hydroxide, calcium carbonate, magnesium oxide, calcium oxide, trimethylamine, triethylamine, triethanolamine, 1,8-diazabicyclo [5,4,0] undecene-7, or the like.

These carbonates, hydroxides and oxides of the alkali metals or the alkali earth metals contain no nitrogen constituent. On the other hand, the tertiary amine contains the nitrogen constituent, but the nitrogen constituent is not incorporated into the phenol resin. In addition to the above-described components, a lubricant, fibers, epoxy resin, and/or a coupling agent may be blended, if necessary.

In the present invention, the phenol, aldehyde, catalyst, carbon powder and the optional components are put in a reaction vessel. In addition, a sufficient amount of water for agitating is added into the reaction vessel. By agitating a resultant mixture in the reaction vessel, the additional condensation reaction between the phenol and the aldehyde proceeds.

At the initial stage of the reaction, the resultant mixture is in a mayonnaise-like state having poor viscosity. However, a flowability of the resultant mixture gradually increases by agitating. As the reaction further proceeds, a condensation product of the phenol and the aldehyde including the carbon powder begins to separate from water. Subsequently, a change of state suddenly happens. That is, a uniformly dispersed state of agglomerated particles of the phenol resin generated by the condensation reaction and the carbon powder is suddenly obtained in the reaction vessel.

After the reaction for generating the phenol resin reaches a desired level, the reaction product is cooled, and then agitating is stopped. Since the agglomerated particles settle down in water, it is possible to readily separate the agglomerated particles from water by filtration to obtain the wet granular material. In addition, water remaining in the wet granular material can be readily removed by drying. As a result, a dry granular powder is obtained, which is a preferable state in handling the molding compound of the present invention.

The obtained granular powder is characterized in that a ratio of the carbon powder and the phenol resin is substantially constant in each particle of the granular powder. Since the phenol resin that works as a binder provides an outermost layer with an extremely thin thickness of the granular powder, the carbon-phenol resin molding compound can be obtained with use of a reduced amount of the phenol resin. As a result, it is possible to relatively increase the content of the carbon powder in the molding compound.

Therefore, in the present invention, it is preferred that a content of the carbon powder in the carbon-phenol resin molding compound is 75 wt % or more. As the content of the carbon powder increases, the electric conductivity of the separator obtained by molding the carbon-phenol resin molding compound are further improved. On the other hand, to maintain good mechanical strength and gas impermeability of the separator, it is preferred that the content of the carbon powder in the molding compound is 97 wt % or less.

By the way, when using the hydrophobic phenol, the obtained phenol resin becomes hydrophobicity as the additional condensation reaction proceeds. Therefore, the wet granular material that is a mixture of the phenol resin and the carbon powder can be easily removed from water. In addition, since the reaction product has poor hygroscopicity and water absorbing property, it is possible to avoid the occurrence of agglomeration at the time of filtrating the wet granular material from water or drying the wet granular material to obtain the dry granular powder.

In the present invention, by molding the carbon-phenol resin molding compound, a molded article of a thin-plate shape having required flow channels, through which the fuel gas including hydrogen or the air including oxygen passes, can be obtained as the separator. Therefore, fuel cells can be manufactured by use of the separator of the present invention.

As an example, a method of molding the carbon-phenol resin molding compound to obtain the separator of the present invention is explained. The molding compound is charged into a required die, and then molded at a heating temperature under pressure. For example, it is preferred that the molding step is performed at a heating temperature of 130 to 250° C. under a surface pressure of 10 to 200 MPa.

In particular, it is preferred that the separator is formed by a two-stage molding method comprising the steps of: preparing a carbon-phenol resin molding compound by reacting a phenol with an aldehyde in the presence of a catalyst, while mixing them with a carbon powder such that a content of the carbon powder in the carbon-phenol resin molding compound is 75 wt % or more; pressing the molding compound in a first die at a pre-molding temperature to obtain a pre-molded article having a shape near the final shape of the separator; and pressing the pre-molded article in a second die at a molding temperature higher than the pre-molding temperature to obtain the separator having the final shape.

Specifically, in the first molding step, it is preferred to set a surface pressure value within a range of 5 to 25 MPa. The first molding step can be usually performed at room temperature. Even when the first molding step is performed at a heating temperature, it is required that the heating temperature is 100° C. or less. Then, the pre-molded article is set in a heated die, and then pressed to obtain the molded article having the final shape. In the second molding step, it is preferred to set the heating temperature within a range of 130 to 250° C. At this heating temperature, the pre-molded article can be completely cured. In addition, it is preferred that the surface pressure value used in the second molding step is determined within a range of 10 to 200 MPa, and particularly 25 to 200 MPa. Even when using the carbon-phenol resin molding compound having poor flowability, which is composed of a large amount of the carbon powder and a small amount of the phenol resin, it is possible to obtain the separator with good quality according to the above two-stage molding method.

When reacting the phenol with the aldehyde in the presence of the catalyst, while mixing those reactants with the carbon powder, a thin outermost layer of the phenol resin is uniformly formed on the entire surface of each carbon particle of the carbon powder. Microscopically, there are a lot of fine pores in the phenol resin layer. When the dry granular powder of the molding compound is molded at a heating temperature under pressure, the carbon particles is bonded with each other through the thin phenol resin layer, so that a good electrical conductive state is obtained among the phenol-resin coated carbon particles.

In addition, in the present invention, since a uniformly mixed state of the carbon particles and the phenol resin is readily obtained, it is possible to provide stable quality of the separator for fuel cells. Moreover, the phenol resin on the carbon particles softens at a heating temperature under pressure of the molding step, and then the softened phenol resin flows into clearances among adjacent carbon particles. Therefore, it is possible to substantially avoid the occurrence of residual pores in the obtained molded article.

Thus, the carbon-phenol resin molding compound used to form the separator of the present invention is characterized in that each of the carbon particles is uniformly coated with the thin phenol-resin layer. Therefore, even when the carbon content in the molding compound increases, the carbon particles can be tightly bonded with each other by the presence of the thin phenol resin layer. As a result, it is possible to stably provide the separator having excellent mechanical strength and electrical conductivity and gas impermeability.

Specifically, even when the carbon content in the molding compound is 75 wt % or more, it is possible to obtain the separator having 40 MPa or more of the bending strength, $10 \times 10^{-8}$ cc·cm/cm$^2$·s·atm or less of the gas permeability, and $10 \times 10^{-3}$ Ω·cm or less of resistivity. These properties are particularly adequate for the separator for fuel cells.

EXAMPLES

Example 1

14 parts by weight of o-cresol, 256 parts by weight of a phenol, 380 parts by weight of a 37-wt % formalin, 5.4 parts by weight of potassium hydroxide, 1620 parts by weight of a graphite powder, and 1500 parts by weight of water were put in a reaction vessel with an agitator. A solubility in water of the o-cresol is 2.0 at normal temperature. The graphite powder is of a scale-like powder having an average grain size of about 100 μm and containing 95.3 wt % of fixed carbon. A content of hydrophobic o-cresol in the phenols is 5 wt %. The resultant mixture was heated at 90° C., while agitating. It took 60 minutes to heat the mixture to 90° C. The mixture was maintained at 90° C. for 4 hours to finish the reaction. Subsequently, the reaction product in the reaction vessel was cooled at 20° C., and filtration was performed by use of Nutsche filters to obtain a wet granular material having a water content of 19 wt %.

This wet granular material was applied on a polyethylene sheet in a stainless vat to obtain an applied layer having a thickness of about 2 cm. The applied layer was dried in a hot-air circulating type dryer at the temperature of 45° C. for about 48 hours to obtain a dry granular powder having the water content of 0.7 wt % of the carbon-phenol resin molding compound. The graphite content in the molding compound is 85.8 wt %. The content of the phenol resin in the molding compound is 14.2 wt %. The nitrogen content in the molding compound is 0.02 wt %. The nitrogen content was measured by Kjeldahl method.

The obtained dry granular powder was charged into a required die heated at 160° C., and then molded under a surface pressure of about 25 MPa for 3 min to obtain a separator for fuel cells of Example 1.

Example 2

175 parts by weight of o-cresol, 175 parts by weight of a phenol, 480 parts by weight of a 37-wt % formalin, 7 parts by weight of potassium hydroxide, 1560 parts by weight of a graphite powder and 1500 parts by weight of water were put in a reaction vessel. A solubility in water of the o-cresol is 2.0 at normal temperature. The graphite powder is of a scale-like powder having an average grain size of about 6 μm and containing 95.3 wt % of fixed carbon. A content of hydrophobic o-cresol in the phenols is 50 wt %. Then, according to a similar procedure to Example 1, a wet granular material having a water content of 21 wt % was obtained.

Next, as in the case of Example 1, the wet granular material was dried to obtain a dry granular powder having the water content of 0.7 wt % of the carbon-phenol resin molding compound. The graphite content in the molding compound is 81.7 wt %. The content of the phenol resin in the molding compound is 18.3 wt %. The nitrogen content in the molding compound is 0.01 wt %. The nitrogen content was measured by Kjeldahl method.

The obtained dry granular powder was charged into a required die heated at 160° C., and then molded under a surface pressure of about 25 MPa for 3 min to obtain a separator for fuel cells of Example 2.

Example 3

385 parts by weight of a mixed cresol of o-cresol, m-cresol and p-cresol, 490 parts by weight of a 37-wt % formalin, 7.7 parts by weight of potassium hydroxide, 1540 parts by weight of a graphite powder and 1500 parts by weight of water were put in a reaction vessel. A solubility in water of the mixed cresol is 2.0 at normal temperature. The graphite powder is of a scale-like powder having an average grain size of about 6 μm and containing 95.3 wt % of fixed carbon. The mixed cresol has hydrophobicity. Then, according to a similar procedure to the Example 1, a wet granular material having a water content of 21 wt % was obtained.

In addition, as in the case of Example, 1, the wet granular material was dried to obtain a dry granular powder having the water content of 0.7 wt % of the carbon-phenol resin molding compound. The graphite content in the molding compound is 79.9 wt %. The content of the phenol resin in the molding compound is 20.1 wt %. The nitrogen content in the molding compound is 0.02 wt %. The nitrogen content was measured by Kjeldahl method.

The obtained dry granular powder was charged into a required die heated at 160° C., and then molded under a surface pressure of about 25 MPa for 3 min to obtain a separator for fuel cells of Example 3.

Example 4

385 parts by weight of a mixed cresol of o-cresol, m-cresol and p-cresol, 490 parts by weight of a 37-wt % formalin, 7.7 parts by weight of sodium hydroxide, 1540 parts by weight of a graphite powder and 1500 parts by weight of water were put in a reaction vessel. A solubility in water of the mixed cresol is 2.0 at normal temperature. The graphite powder is of a scale-like powder having an average grain size of about 6 μm and containing 95.3 wt % of fixed carbon. The mixed cresol has hydrophobicity. Then, according to a similar procedure to the Example 1, a wet granular material having a water content of 21 wt % was obtained.

In addition, as in the case of Example, 1, the wet granular material was dried to obtain a dry granular powder having the water content of 0.7 wt % of the carbon-phenol resin molding compound. The graphite content in the molding compound is 79.7 wt %. The content of the phenol resin in the molding compound is 20.3 wt %. The nitrogen content in the molding compound is 0.02 wt %. The nitrogen content was measured by Kjeldahl method.

The obtained dry granular powder was charged into a required die heated at 160° C., and then molded under a surface pressure of about 25 MPa for 3 min to obtain a separator for fuel cells of Example 4.

Example 5

439 parts by weight of a mixed cresol of o-cresol, m-cresol and p-cresol, 560 parts by weight of a 37-wt % formalin, 9.0 parts by weight of trimethylamine, 1370 parts by weight of a graphite powder and 1300 parts by weight of water were put in a reaction vessel. A solubility in water of the mixed cresol is 2.0 at normal temperature. The graphite powder is of a scale-like powder having an average grain size of about 6 μm and containing 95.3 wt % of fixed carbon. The mixed cresol has hydrophobicity. Then, according to a similar procedure to the Example 1, a wet granular material having a water content of 21 wt % was obtained.

In addition, as in the case of Example, 1, the wet granular material was dried to obtain a dry granular powder having the water content of 0.7 wt % of the carbon-phenol resin molding compound. The graphite content in the molding compound is 75.7 wt %. The content of the phenol resin in the molding compound is 24.3 wt %. The nitrogen content in the molding compound is 0.02 wt %. The nitrogen content was measured by Kjeldahl method.

The obtained dry granular powder was charged into a required die heated at 160° C., and then molded under a surface pressure of about 25 MPa for 3 min to obtain a separator for fuel cells of Example 5.

Example 6

The dry granular powder obtained in Example 1 was molded under a surface pressure of about 10 MPa at room temperature to obtain a pre-molded article having a shape near the final shape of a separator. Then, the pre-molded article was charged into a required die heated at 160° C., and then molded under a surface pressure of about 50 MPa for 3 min to obtain the separator for fuel cells of Example 6.

Example 7

505 parts by weight of a mixed cresol of o-cresol, m-cresol and p-cresol, 644 parts by weight of a 37-wt % formalin, 10.1 parts by weight of potassium hydroxide, 1300 parts by weight of a graphite powder and 1300 parts by weight of water were put in a reaction vessel. A solubility in water of the mixed cresol is 2.0 at normal temperature. The graphite powder is of a scale-like powder having an average grain size of about 6 μm and containing 95.3 wt % of fixed carbon. The mixed cresol has hydrophobicity. Then, according to a similar procedure to the Example 1, a wet granular material having a water content of 21 wt % was obtained.

In addition, as in the case of Example, 1, the wet granular material was dried to obtain a dry granular powder having the water content of 0.7 wt % of the carbon-phenol resin molding compound. The graphite content in the molding compound is 72 wt %. The content of the phenol resin in the molding compound is 28 wt %. The nitrogen content in the molding compound is 0.02 wt %. The nitrogen content was measured by Kjeldahl method.

The obtained dry granular powder was charged into a required die heated at 160° C., and then molded under a surface pressure of about 25 MPa for 3 min to obtain a separator for fuel cells of Example 7.

Example 8

347 parts by weight of a phenol, 448 parts by weight of a 37-wt % formalin, 36 parts by weight of hexamethylene tetramine, 1550 parts by weight of a graphite powder, and 1500 parts by weight of water were put in a reaction vessel with an agitator. The graphite powder is of a scale-like powder having an average grain size of about 6 μm and containing 95.3 wt % of fixed carbon. Then, according to a similar procedure to the Example 1, a wet granular material having a water content of 21 wt % was obtained.

In addition, as in the case of Example, 1, the wet granular material was dried to obtain a dry granular powder having the water content of 0.7 wt % of the carbon-phenol resin molding compound. The graphite content in the molding compound is 81.7 wt %. The content of the phenol resin in the molding compound is 18.3 wt %. The nitrogen content in the molding compound is 0.9 wt %. The nitrogen content was measured by Kjeldahl method.

The obtained dry granular powder was charged into a required die heated at 160° C., and then molded under a surface pressure of about 25 MPa for 3 min to obtain a separator for fuel cells of Example 8.

Comparative Example 1

240 parts by weight of a powder-like alkali-resol type phenol resin were ball-milled, and then a required amount of methanol was added to the ball-milled phenol resin to obtain a slurry. Next, 760 parts by weight of a graphite powder was added to the slurry and then a resultant mixture was agitated by use of a kneader. The graphite powder is of a scale-like powder having an average grain size of 100 μm and containing 95.3 wt % of fixed carbon. After the resultant mixture was dried at 60° C., a small amount of magnesium stearate was added and mixed by use of a mixer to obtain a carbon-phenol resin molding compound. The graphite content in the molding compound is 76 wt %. The content of the phenol resin in the molding compound is 24 wt %. The nitrogen content in the molding compound is 0.02 wt %.

The molding compound was charged into a required die heated at 160° C., and then molded under a surface pressure of about 25 MPa for 3 min to obtain a separator for fuel cells of Comparative Example 1.

Evaluation

Compositions of the molding compounds of Examples 1 to 8 and Comparative Example 1 are shown in Table 1. With respect to the molding compound of each of Examples 1 to 8 and Comparative Example 1, bending strength, resistivity, gas impermeability and EMF (electromotive force) characteristics were measured. That is, the bending strength was measured by use of a specimen (10 mm×4 mm×80 mm) according to the method described in JIS (Japanese Industrial Standards) K 7171. The resistivity was measured by use of a test piece having a thickness of 2 mm according to the method described in JIS K 7194. The gas impermeability was determined by providing a space filled with nitrogen gas under an atmospheric pressure at a side of the test piece, and measuring an amount of nitrogen gas transmitted through the test piece at the opposite side of the test piece. In addition, the EMF characteristics were measured by preparing a fuel cell (stack number: 2), and measuring an electromotive force between a pair of cells, while running a cooling water (antifreeze liquid: ion exchange water 50 wt %). In Table. 2, the symbol "◯" designates that a reduction in EMF did not happened, and the symbol "x" designates that the reduction in EMF happened. Results are shown in Table 2.

As shown in Table 1, the separator of each of Examples 1 to 8 has smaller resistivity and higher electrical conductivity in comparison with the separator of Comparative Example 1. In addition, the separators of those Examples exhibit excellent bending strength and gas impermeability. Since the carbon content in the molding compound of Example 7 is relatively small, the electrical conductivity is slightly lower in comparison with the other Examples. In addition, since the nitrogen content in the molding compound of Example 8 is relatively large, a reduction in EMF happened.

TABLE 1

|  | Phenols |  | Hydrophobic phenol | Aldehyde | Catalyst |
| --- | --- | --- | --- | --- | --- |
| Example 1 | Phenol | o-cresol | 5 | Formalin | KOH |
| Example 2 | Phenol | o-cresol | 50 | Formalin | KOH |
| Example 3 | — | mixed cresol | 100 | Formalin | KOH |
| Example 4 | — | mixed cresol | 100 | Formalin | NaOH |
| Example 5 | — | mixed cresol | 100 | Formalin | Triethylamine |
| Example 6 | Phenol | o-cresol | 5 | Formalin | KOH |
| Example 7 | — | mixed cresol | 100 | Formalin | KOH |
| Example 8 | Phenol | — | 0 | Formalin | Hexamethylenetetramine |
| Comparative Example 1 | Phenol | — | 0 | Formalin | KOH |

TABLE 2

|  | Resin (wt %) | Graphite Powder (wt %) | Bending Strength (MPa) | Resistivity ($\Omega \cdot cm$) | Gas Transmittance ($cc \cdot cm/cm^2 s \cdot atm$) | Nitrogen constituent (wt %) | Reduction in EMF |
| --- | --- | --- | --- | --- | --- | --- | --- |
| Example 1 | 14.2 | 85.8 | 44 | $4.8 \times 10^{-3}$ | $<6 \times 10^{-8}$ | 0.02 | ◯ |
| Example 2 | 18.3 | 81.7 | 47 | $6.3 \times 10^{-3}$ | $<5 \times 10^{-8}$ | 0.01 | ◯ |
| Example 3 | 20.1 | 79.9 | 51 | $8.2 \times 10^{-3}$ | $<5 \times 10^{-8}$ | 0.02 | ◯ |
| Example 4 | 20.3 | 79.7 | 53 | $8.3 \times 10^{-3}$ | $<5 \times 10^{-5}$ | 0.02 | ◯ |
| Example 5 | 24.3 | 75.7 | 58 | $9.8 \times 10^{-3}$ | $<5 \times 10^{-8}$ | 0.02 | ◯ |
| Example 6 | 14.2 | 85.8 | 58 | $4.9 \times 10^{-3}$ | $<5 \times 10^{-8}$ | 0.02 | ◯ |
| Example 7 | 28 | 72 | 60 | $1.2 \times 10^{-2}$ | $<5 \times 10^{-5}$ | 0.02 | ◯ |
| Example 8 | 18.3 | 81.7 | 50 | $5.9 \times 10^{-3}$ | $<5 \times 10^{-8}$ | 0.9 | X |
| Comparative Example 1 | 24 | 76 | 42 | $1.6 \times 10^{-2}$ | $5 \times 10^{-6}$ | 0.02 | ◯ |

What is claimed is:

1. A method of manufacturing a separator for fuel cells, comprising the steps of:

reacting a phenol with an aldehyde in the presence of a catalyst, while mixing with a graphite powder, to obtain a graphite-phenol resin molding compound; and molding the molding compound to obtain said separator, wherein a graphite content in the molding compound is within a range of 75 wt % to 97 wt %, wherein said catalyst is at least one selected from tertiary amines, carbonates, hydroxides and oxides of alkali metals or alkali earth metals, and wherein a content of nitrogen constituent in the molding compound is 0.3 wt % or less.

2. The method as set forth in claim 1, wherein the molding compound is molded in a thin-plate shape having a flow channel.

3. The method as set forth in claim 1, wherein said graphite powder contains 90 wt % or more of fixed carbon.

4. The method as set forth in claim 1, wherein the molding compound is molded at a temperature of 130 to 250° C. under a pressure of 10 to 200 MPa.

5. The method as set forth in claim 1, wherein said phenol contains 5 wt % or more of a hydrophobic phenol.

* * * * *